United States Patent [19]

Winters

[11] Patent Number: 5,481,570

[45] Date of Patent: Jan. 2, 1996

[54] BLOCK RADIO AND ADAPTIVE ARRAYS FOR WIRELESS SYSTEMS

[75] Inventor: Jack H. Winters, Middletown Township, Monmouth County, N.J.

[73] Assignee: AT&T Corp., Murray Hill, N.J.

[21] Appl. No.: 140,354

[22] Filed: Oct. 20, 1993

[51] Int. Cl.[6] .................................................. H04B 7/10
[52] U.S. Cl. ......................... 375/347; 455/137; 455/273
[58] Field of Search .................................. 375/267, 347; 364/725, 726; 455/133–137, 273, 277.1, 277.2

[56] References Cited

U.S. PATENT DOCUMENTS

| | | | |
|---|---|---|---|
| 4,112,430 | 9/1978 | Ladstatter | 455/273 |
| 4,528,656 | 7/1985 | Morais | 370/30 |
| 5,029,184 | 7/1991 | Andren et al. | 375/267 |
| 5,220,557 | 6/1993 | Kelley | 370/50 |
| 5,297,171 | 3/1994 | Koch | 375/347 |
| 5,321,850 | 6/1994 | Bäckström et al. | 455/273 |
| 5,357,502 | 10/1994 | Castelain et al. | 370/19 |
| 5,367,539 | 11/1994 | Copley | 375/347 |
| 5,379,324 | 1/1995 | Mueller et al. | 375/347 |

OTHER PUBLICATIONS

"The Capacity of Wireless Communication Systems Can Be Substantially Increased By The Use Of Antenna Diversity", R. D. Gitlin, J. Salz.

J. H. Winters, in The *Proc. of the First International Conference on Universal Personal Communications*, Sep. 29–Oct. 2, 1992, Dallas, Tex. pp. 28–32.

Adaptive Filters, C. F. N. Cowan and P. M. Grant, Prentice–Hall, Inc. 1985, pp. 177–179, pp. 152–157.

Introduction to Adaptive Arrays, R. A. Monzingo and T. W. Miller, John Wiley and Sons, New York, 1980, pp. 162–166.

"On the Complexity of Frequency–Domain Adaptive Filtering", Neil K. Jablon, *IEEE Transactions on Signal Processing*, vol. 39, No. 10 Oct. 1991, pp. 2331–2334.

"Optimum Combining in Digital Mobile Radio with CoChannel Interference", *IEEE Journal on Selected Areas in Communications*, vol. SAC–2, No. 4, Jul. 1984, pp. 528–539.

"Spread Spectrum in a Four–Phase Communications System Employing Adaptive Antenna", *IEEE Transaction on Communications*, vol. COM–30, No. 5, May 1982, pp. 929–936.

*Primary Examiner*—Young Tse

[57] ABSTRACT

A radio system having a master station including a wideband receiver, an A/D converter and a digital signal processing module for each of a plurality of space diversity antennas, the digital signal processing module converting the digitized samples into the frequency domain, weighting and combining the frequency domain signals from each of the antennas and separating the signals into signals corresponding to those transmitted from the remote stations.

5 Claims, 2 Drawing Sheets

BLOCK RADIO AND ADAPTIVE ARRAYS FOR WIRELESS SYSTEMS

FIELD OF THE INVENTION

This invention relates to radio receiver and transmitter systems and, more particularly, to such systems which employ adaptive antenna arrays.

BACKGROUND OF THE INVENTION

Mobile radio is today presented with a number of alternative and largely incompatible signal transmission systems, including the analog system of AMPS, the North American Digital Mobile Radio Standard IS-54, and Qualcomm's CDMA system. The systems each require dedicated, application-specific hardware and most of the hardware designed for one system is useless with the others. Furthermore, although various techniques have been proposed in each of these systems to improve performance and increase capacity by reducing signal interference and fading problems, implementation of these techniques in any given system is often seriously constrained by the expense entailed in the required hardware addition and/or replacement.

For example, the use of space diversity reception at the base station has been proposed to overcome fading and signal interference. In a space diversity radio system, signals received by a plurality of antennas are processed to overcome fading and interference due to other users. See, in this regard, "Optimum Combining in Digital Mobile Radio with Cochannel Interference", J. H. Winters, in the *IEEE Journal on Selected Areas in Communications,* vol. SAC-2, No. 4, July 1984. Such processing can include multiplying the signal from each antenna element by a controllable weight to adjust the phase and amplitude of the signal and then combining these signals to generate the output signal. The pattern of the adaptive array is thereby changed to reduce the power of interfering signals and to optimize desired signal reception, substantially increasing the capacity and performance of mobile radio systems. Similarly, multiple transmit antennas at the base station can be used to improve the capacity and performance at the mobile. In particular, using optimum combining, whereby the signals are weighted and combined to minimize the mean square error in the output signal, an M-fold increase in capacity can be achieved with M antennas, as shown in "The capacity of wireless communication systems can be substantially increased by the use of antenna diversity", R. D. Gitlin, J. Salz, J. H. Winters, in the *Proc. of the First International Conference on Universal Personal Communications,* Sep. 29–Oct. 2, 1992, Dallas, Tex., pp. 28–32. Thus, modular growth can be achieved by simply adding antennas to the base station. Although the major cost of such improvements is now at the base station, where the cost is shared among the users, the magnitude of the investment required to add to and modify the hardware to handle the additional antenna signals at the base station can be staggering, particularly when considering the large number of channels the base station may have to process, e.g., up to 333 channels/users in the AMPS system or 1000 users with 333 frequency channels in an IS-54 system. Such investment is even less likely if the hardware must be replaced with each system change.

SUMMARY OF THE INVENTION

The inability of prior art mobile radio systems to accommodate techniques for improving fading and interference immunity is overcome in accordance with the principles of the present invention, in one illustrative embodiment in which block radio reception is combined with adaptive array processing performed in the frequency domain. Each of a plurality of base station antennas is provided with at least one respective wideband RF receiver, which moves the bandwidth of interest to an IF frequency, and an analog to digital (A/D) converter. The bandwidth of the receiver is chosen so that it will embrace all of the multiple mobile channels in the particular band to which it is tuned. All remaining tasks required for the further reception of signals, including channel separation, filtering, demodulation, carrier and timing recovery, equalization and adaptive antenna array processing, are performed with programmable digital signal processors. Specifically, blocks of received samples from the A/D converter of each antenna are transformed into the frequency domain where filtering and equalization is performed. The frequency domain data from a plurality of antennas are then combined for channel separation and conversion to the time domain for demodulation. Similarly, for transmission, the digital signal, each representing the signals in multiple channels, are converted to analog and these signals are transmitted using a plurality of wideband transmitters and antennas.

DESCRIPTION OF THE DRAWING

The foregoing objects and features may become more apparent by referring now to the drawing of an illustrative embodiment of my invention in which.

GENERAL DESCRIPTION

Figure 1:
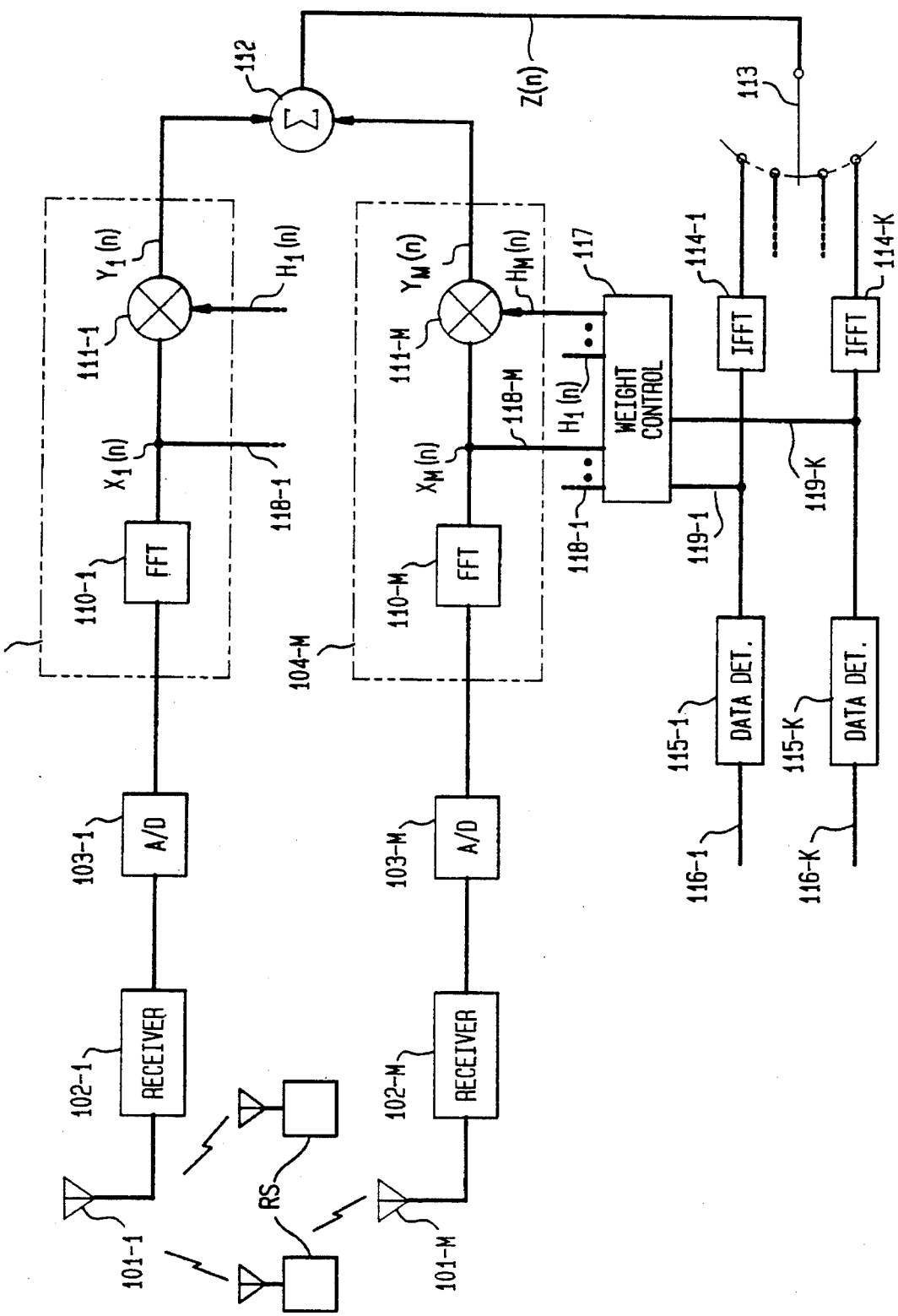
FIG. 1 is a block diagram of a block radio receiving system employing space diversity reception at a mobile radio base station.

FIG. 1 shows a base station having a M-element adaptive antenna array 101-1 through 101-M and a plurality of remote stations RS. Each element of the M-element adaptive array of the base station is associated with a respective wideband tunable receiver 102-1 through 102-M, an A/D converter 103-1 through 103-M and digital signal processing circuitry 104-1 through 104-M. Receivers 102-1 through 102-M each use a mixer with a local oscillator (not shown) to translate the bandwidth of interest (e.g., the bandwidth that embraces the number of mobile radio channels assigned in the band to which the receivers are currently tuned), down to an IF and to filter out unwanted frequencies. Receivers 102-1 through 102-M may advantageously be tunable to cover all, or a portion of, the mobile band, e.g., 10 MHz at 900 MHz in IS-54 or AMPS. The receivers may also be tunable to other bands, such that the same unit can be easily modified for use at other frequencies, e.g., 1.8 GHz. The signal from each receiver is A/D converted at a sampling rate sufficient to allow for reconstruction of the received signal, typically two times the bandwidth.

The digitized signals are then passed to the digital processing circuitry 104-1 through 104-M, which advantageously implements all remaining elements of the system using digital signal processors. In the digital circuitry, blocks of 2N samples are converted to the frequency domain using FFT modules 110-1 through 110-M. The frequency domain data blocks which represent the received signal short term spectra, $X_i(n)$, i=1, ..., M, n=1, ..., 2N, are then presented to multipliers 111-1 through 111-M. These multipliers implement frequency domain filtering by multiplying the frequency domain data by $H_1(n)$ to $H_M(n)$, to generate the weighted frequency spectra $Y_1(n)$ through $Y_M(n)$, i.e., $$Y_i(n)=X_i(n)H_i(n), i=1, \ldots, M, n=1, \ldots, 2N.$$

The $H_1(n)$ represents the frequency response corresponding to the combination of the receive filter, equalizer, and adaptive array combining weights. The generation of $H_1(n)$ is described below. It is important to note that the use of frequency domain processing allows the receive filter to be implemented as a multiplication rather than a convolution in the time domain, which generally reduces processing. In addition, equalization and combing weights are implemented without any additional processing.

Figure 2A:
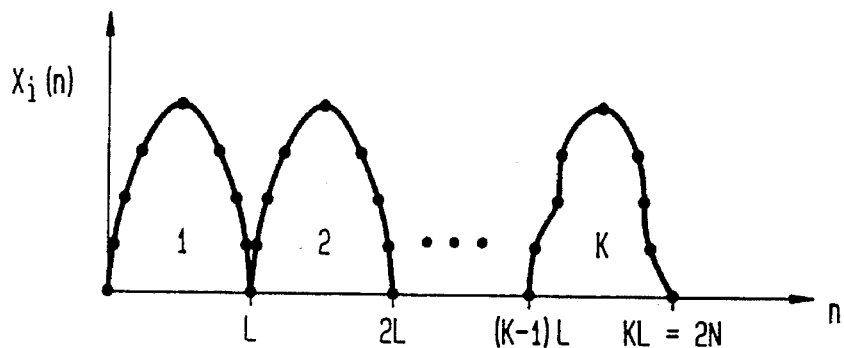
FIGS. 2a through 2c are diagrams of K-channel system showing, respectively, frequency domain data, the filter, equalization, and combining weights, and the weighted frequency domain spectra for the ith antenna.
Figure 2B:
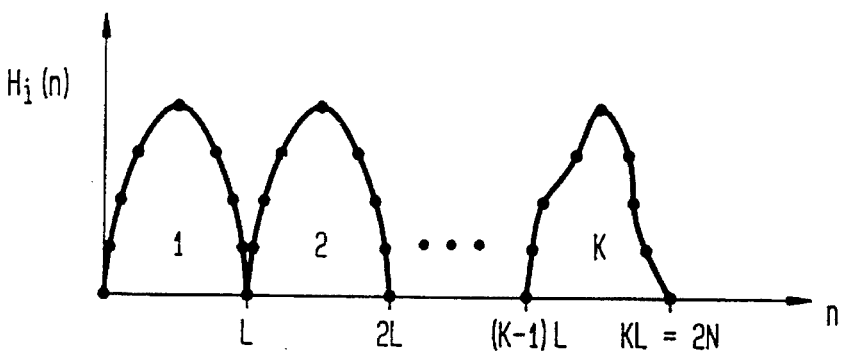
Figure 2C:
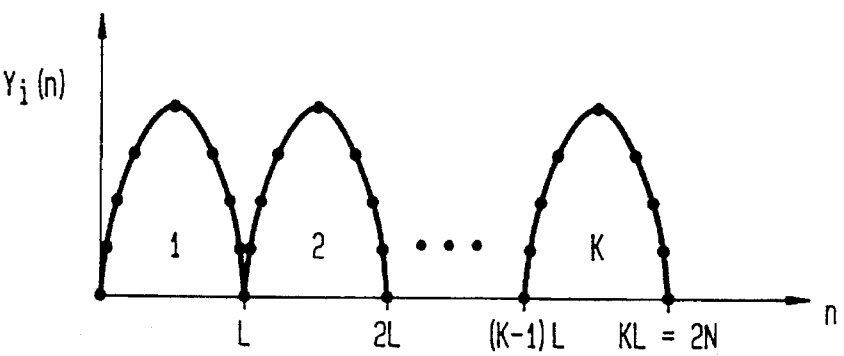

FIG. 2 illustrates the filtering and equalization of the frequency domain data with K channels. FIG. 2a shows the frequency spectrum of the received signal $X_i(n)$ for K channels and FIG. 2b shows the filter and equalizer coefficients. The resulting weighted frequency spectrum, $Y_i(n)$ is shown in FIG. 2c. In these figures, the dots represent the frequency spectrum samples, with L samples for each of the K channels.

The outputs of the M multipliers, $Y_i(n)$, i=1, ..., M, are passed to digital signal processing circuitry which includes summer 112. The summer output, Z(n), is the short term frequency spectrum of the output signals.

The separation of the individual channels and conversion to the time domain takes advantage of the fact that each channel is represented in the summer output, Z(n), over the n corresponding to that channel, i.e., Z(1) through Z(L) is the frequency spectrum of channel 1, Z(L+1) through Z(2L) is the frequency spectrum of channel 2, etc. Thus, to separate each channel and convert to the time domain, commutator 113 distributes the Z(n), n=1, ..., 2N, to a bank of inverse FFT modules 114-1 through 114-K to generate the output signals samples $b_1(m)$ through $b_K(m)$, one for each of the K channels. That is, Z(1) through Z(L) is sent to module 114-1, Z(L+1) through Z(2L) is sent to module 114-2, and so forth. Data detectors 115-1 through 115-K determine the received data symbols $a_1(m)$ through $a_K(m)$ corresponding to the received signal samples. These data symbols are sent into the telephone network using lines 116-1 through 116-M. It is important to note that since the FFT uses circular convolution to transform the signal, rather than linear convolution, the processor must use 2N samples out the A/D converter to generate N/K symbols per channel on lines 117-1 through 117-K, as discussed in *Adaptive Filters*, C. F. N. Cowan and P. M. Grant, Prentice-Hall, Inc 1985, pp. 177–179.

Next, consider the generation of weights $H_1(n)$ through $H_M(n)$. These weights are the product of the receive filter weights $H_R(n)$ and the adaptive array equalizer weights $H_{EQi}(n)$, i=1, ..., M. The receive filter weights are fixed and are periodic (K-fold) since the filter weights are repeated for each channel. The equalizer weights can be calculated in the time domain or in the frequency domain—both techniques have been studied. For example, time domain processing can be done use the LMS or DMI algorithms as described in *Introduction to Adaptive Arrays*, R. A. Monzingo and T. W. Miller, John Wiley and Sons, New York, 1980, pp.162–166, and the weights converted into the frequency domain using an FFT. However, frequency domain weight generation may be preferred since frequency domain spectra for the receiver and combiner output signals are available and the calculated weights must be in the frequency domain. One technique for frequency domain weight calculation is described in *Adaptive Filters, Id.* at pp. 152–157. This technique requires both frequency domain received data, $X_i(n)$, i=1, ..., M, and the time domain output data, $b_j(n)$, j=1, ..., K. This preferred embodiment is shown in FIG. 1, where weight generation circuitry 117 uses frequency domain received data on input lines 118-1 through 118-M and time domain output data on lines 119-1 through 119-K to generate the weights used on output lines 120-1 through 120-M for multiplier modules 111-1 through 111-M, respectively.

What has been described is deemed to be illustrative of the principles of my invention. Further and other modifications may be made by those skilled in the art. It should be understood, for example that, the illustrative embodiment is most suited for digital systems with frequency division multiplexing (FDM), such as used in IS-54. However, with only a modification in the software, the same circuitry can be used with analog FM signals, such as AMPS, by using the detector to generate the analog FM signals from the frequency domain samples. For CDMA, the technique can be used to implement the RAKE receiver in the frequency domain. With the RAKE receiver in the time domain, the received signal is correlated with time offset versions of the spread spectrum code. With my technique, the correlations are done by multiplications in the frequency domain, which reduces the complexity of the digital signal processing. Also, the technique can be used for transmission as well as reception, as described above, in which case the processes of FIG. 1 are reversed. The data from multiple channels is processes by the digital signal processing circuitry where it is encoded, converted to the frequency domain, and the frequency domain data for all channels are combined and weighted for each antenna and converted to the time domain. The time domain data is D/A converted and the analog signals are transmitted by antennas 101-1 through 101-M using wideband transmitters. In addition, my technique is applicable to any point-to-multipoint wireless system, such as personal communication systems.

What is claimed is:

1. In a system for effecting two-way radio transmission between a master station and plurality of remote stations, the master station including a plurality of space diversity antennas, the improvement comprising,
   a. respective to each of said antennas:
      i. a wideband receiver for receiving signals from multiple ones of said remote stations,
      ii. an analog to digital (A/D) converter for converting the received signals into digitized samples, and
      iii. a digital signal processing module including
         (1) a transform module for converting said digitized samples into frequency domain signals, and
         (2) a weighting module for weighting a respective one of said frequency domain signals; and
   b. common to said plurality of space diversity antennas,
      i. means for summing the weighted frequency domain signals,
      ii. an array of inverse transform modules; and
      iii. means responsive to the summed frequency domain signals for separating the weighted frequency domain signals into channel signals and for distributing said channel signals to said array of inverse transform modules.

2. A system according to claim 1 wherein each said transform module is a Fourier transform module and wherein said inverse transform modules are inverse Fourier transform modules.

3. A system according to claim 2 wherein each said weighting module filters said frequency domain signals.

4. A system according to claim 2 including means responsive to the outputs of said inverse transform modules for adjusting said weighting modules.

5. A method for effecting two-way radio transmission between a master station and plurality of remote stations, the master station including a plurality of space diversity antennas, comprising,
  a. at each of said space diversity antennas:
     i. receiving signals from multiple ones of said remote stations,
     ii. converting the received signals into digitized samples,
     iii. converting said digitized samples into frequency domain signals, and
     iv. weighting respective ones of said frequency domain signals; and
  b. common to said plurality of space diversity antennas:
     i. summing the weighted frequency domain signals,
     ii. separating the summed, weighted frequency domain signals into channel signals, and
  g. converting said channel signals into time domain signals.

* * * * *